Oct. 19, 1971     R. H. HEISE     3,613,477

WEDGE-LOCK COLLAPSIBLE STEERING COLUMN

Filed July 6, 1970     2 Sheets-Sheet 1

INVENTOR
ROBERT H. HEISE

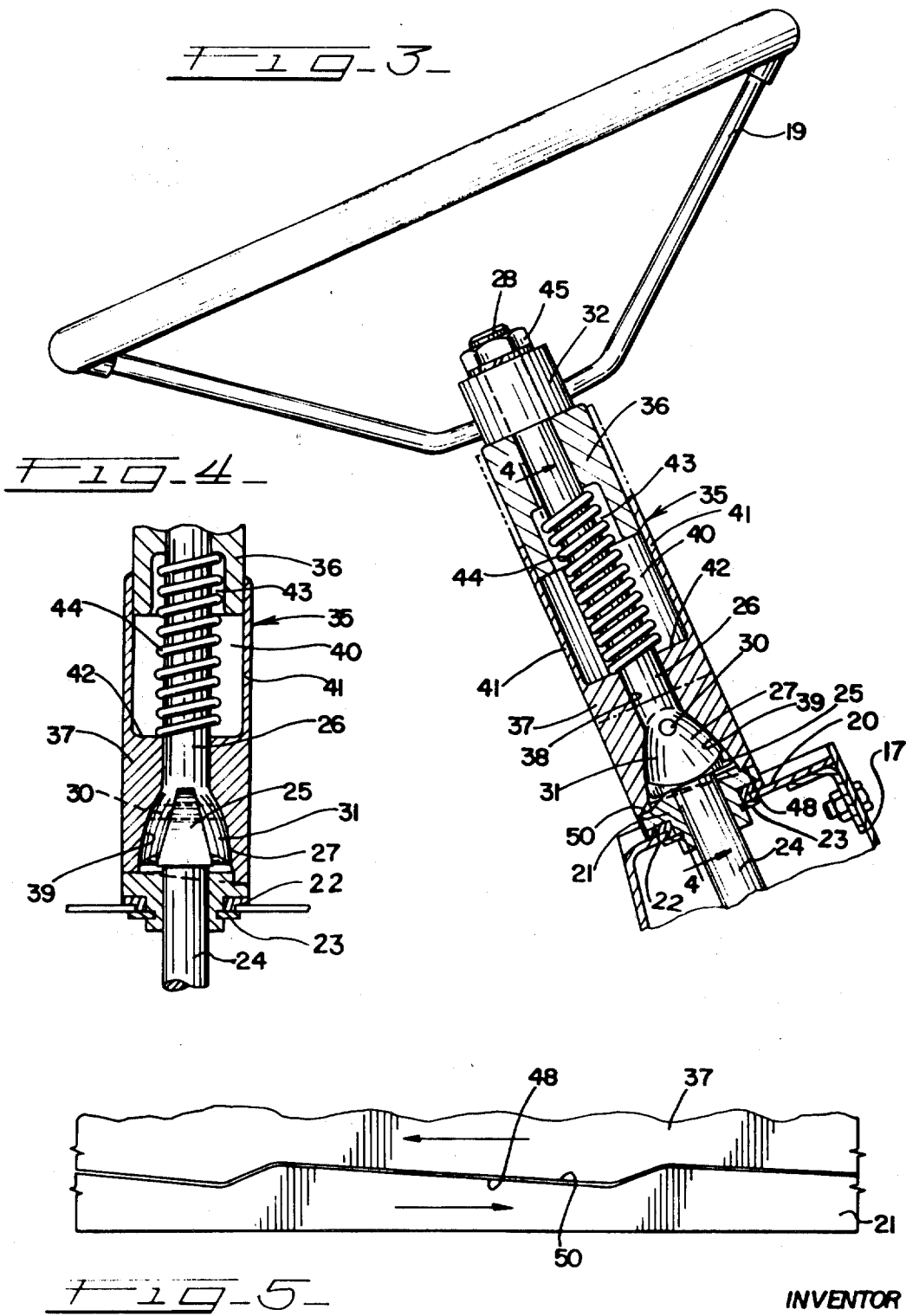

3,613,477
WEDGE-LOCK COLLAPSIBLE STEERING COLUMN

Robert H. Heise, Glen Ellyn, Ill., assignor to
International Harvester Company, Chicago, Ill.
Filed July 6, 1970, Ser. No. 52,276
Int. Cl. B62d 1/18
U.S. Cl. 74—493                                    14 Claims

ABSTRACT OF THE DISCLOSURE

A steering column adaptable for use as a component of a steering assembly for riding mowers, the column including a pair of shafts having adjacent ends hingedly connected by a mating clevis arrangement and telescoping collars one of which fits around the clevis arrangement and is operative to tightly wedge the shafts in axial alignment with the each other.

BACKGROUND OF THE INVENTION

The invention generally relates to a steering assembly adaptable for use on vehicles such as riding mowers, garden tractors and the like, and is more particularly directed toward the steering column of such an assembly The design of such vehicles dictates that the steering wheel be positioned for the convenience of the operator; therefore, it will project above the body of the vehicle resulting in a machine having a relatively high profile. This often prevents such machines from being loaded into a station wagon automobile or stored under benches and other places having low head room. To avoid this problem the steering column can be made to be either disassembled or have a mechanism enabling it to be collapsed from an upright operating position to a storage position at which the profile of the machine is substantially lowered.

The invention is directed toward a mechanism which allows a steering column to be selectively collapsed from an upright operating position to one remote therefrom; and more particularly to the type of mechanism which is operative to releasably lock hinged shafts of a steering column in axial alignment with each other by means of a locking collar which slides over a common hinged connection. Heretofore this has been done by selectively positioning a collar with a cylindrical inner bore over the shafts and hinged connection. One of the problems encountered with this type of locking device is that the inner bore must be closely fitted relative to each of the shafts to prevent relative movement between the shafts. Such movement manifests itself as looseness and wiggle movement in the steering wheel which is highly undesirable in a product offered to the public in a competitive market place. The invention solves the aforementioned problem by providing a releasable locking mechanism operative on a hinged management of shafts such that they are tightly locked in axial alignment through a wedging action. This action effects a self-seating of wedging components which provides a means by which the mechanism self adjusts for wear and manufacture tolerance differentials.

A generally object of the invention is to provide a steering column which is selectively positionable in an operating position and collapsed position remote therefrom.

Another object of the invention is to provide a steering column having a shaft hingedly mounted to a member wherein the shaft is releasably retained in a predetermined alignment relative to said member.

An object of the foregoing is to provide that the shaft and the member form a pivotal juncture which can be wedged and thereby releasably locked in said alignment by an enveloping collar.

A still further object of the invention is to provide that the pivotal juncture of the shaft and the member form an outer structure which coacts with the inner surface of the collar such that forces are produced therebetween which have directions generally normal to said surfaces.

A more specific object of the foregoing is to provide that wall structure formed by the juncture of the shaft and the member have a conoidal shape, and that the mating portion of the enveloping collar have a contour which wedgingly mates with the shape of the wall structure of the juncture.

Another object of the invention is to provide that the locking collar have a peripheral wall structure which telescopes about a second collar in the collapsed position whereat the second collar provides an underlying support for telescope portion of the locking collar.

Other objects and features of the invention will become apparent as the description proceeds, especially when taken in conjunction with the accompanying drawings illustrating a preferred embodiment of the invention.

DESCRIPTION OF THE DRAWINGS

FIG. 3 is an enlarged section view of the collapsible steering column incorporating the concepts of the invention;

FIG. 4 is a fragmentary sectional view taken substantially at line 4—4 of FIG. 3; and FIG. 5 is a development view showing a releasing cam formed at the lower end of the steering column.

DESCRIPTION OF THE PREFERRED EMBODIMENT

Figure 2:
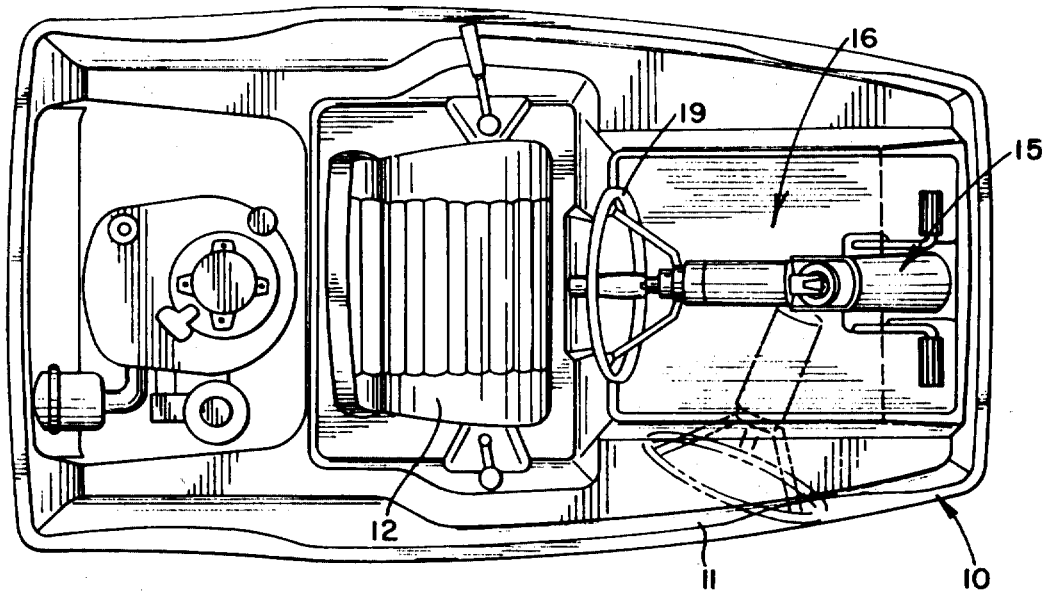
FIG. 2 is a plan view of the riding lawn mower illustrated in FIG. 1.
Figure 1:
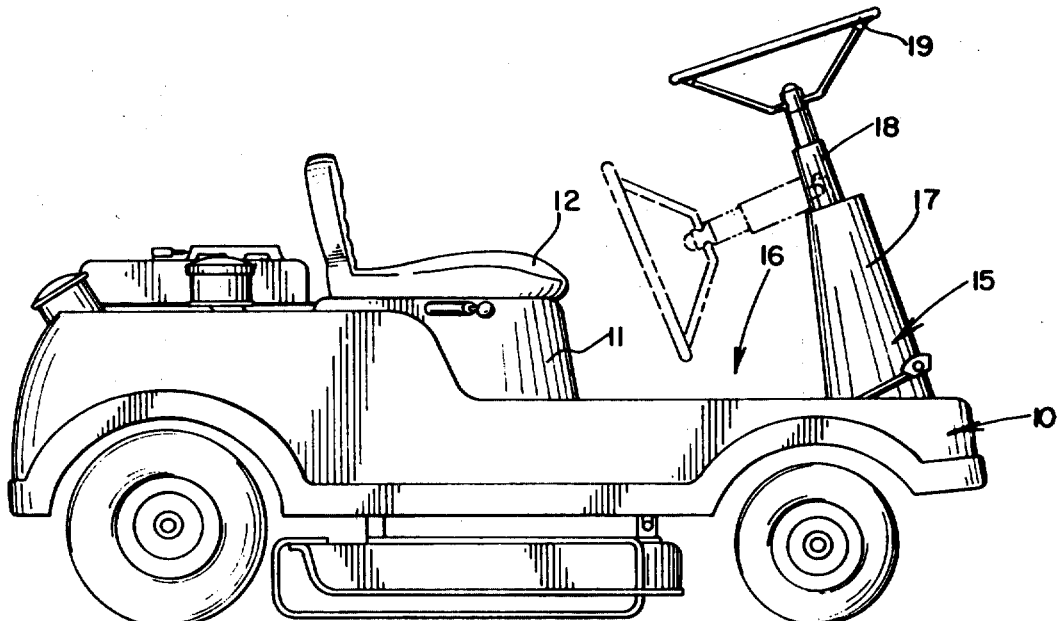
FIG. 1 is a side elevational view of riding lawn mower provided with the novel steering assembly of this invention.

With reference to FIGS. 1 and 2 a self-propelled riding lawn mower 10 is seen to include a frame supported body 11 on which is mounted a seat 12 and a steering assembly generally designated 15. The space between the seat 12 and the steering assembly 15 constitutes the operator's compartment which is designated 16.

The steering assembly 15 includes a lower support portion 17 which carries an upwardly extending steering column 18 on which is mounted a steering wheel 19. The steering column 18 is selectively positionable to a collapsed position as shown in FIG. 2. It can be seen that the steering column 18 in the collapsed position reduces the overall height of the machine by lowering the steering wheel to a height slightly below that of the upper extremities of the seat 12.

As shown in FIGS. 3 and 4 the lower support portion of the steering assembly 15 includes a supporting structure 20 having a bearing 22 on which is journaled a grooved retaining collar 21 being secured in position by a snap ring 23. The collar 21 journally supports a lower steering shaft 24 which is operatively connected to the front wheels of the lawn mower in a conventional manner. The lower steering shaft 24 projects above the collar 21 and has formed thereon wedge-shaped tongue portion 25 having generally arcuated outer surface.

The steering column 18 includes an upper steering shaft 26 having a lower conoidally shaped bifurcated end 27 and an upper threaded end 28. The bifurcated end 27 defines a wedge-shaped slot which closely receives the tongue 25 and is hingedly connected thereat by means of a pin 30. The lower end of the bifurcated end is chamfered to a rounded surface as shown to permit pivotal movement of the upper shaft about the pin 30 to positions such as suggested in FIGS. 1 and 2. It can also be seen that the pivotal arrangement at the juncture of the upper and lower shafts (26, 24) combine to form a substantially continuous protuberant surface taking a shape in this embodiment as conoidal shaped outer wall surface 31 upon the upper and lower shafts being placed in axial alignment.

The steering wheel 19 includes a hub 32 which fixedly mounts on the upper end 28 of the shaft 26.

The steering column includes a releasable locking mechanism generally designated 35 which coacts with the upper and lower shafts 26 and 24 to releasably secure the shafts in axial alignment with each other. The mechanism 35 comprises a pair of cooperably arranged upper and lower collars 36 and 37 respectively, mounted on the upper shaft 26 and coact to provide the means for locking the upper and lower shafts (26, 24) in axial alignment. The lower collar 37 has an internal bore 38 which is diametrically larger than that of the upper shaft 26. At the lower end of the collar 37 the inner bore flares outwardly to form a cavity which has a conoidal surface 39. It should be noted that the cavity is dimensioned and shaped to closely fit over the juncture of the upper and lower shaft 26 and 24 when those shafts are placed in alignment and that the surface 31 of the shafts at the juncture and the surface 39 of the cavity contact each other such that wedging action takes place thereat wherein the lower collar 37 acts upon the juncture to wedge and lock the shafts 24 and 26 in axial alignment with each other. The lower collar 37 also has a cylindrical recess 40 at the other end of that collar. The recess 40 is encompassed by peripheral wall structure 41 which is open at one end and bottoms at an annular surface 42 at the other end thereof.

The upper collar 36 has an outside diameter which conforms to the inside diameter of the recess as defined by the peripheral wall structure 41, whereby the lower and upper collars snugly fit in a telescoping relationship with each other. The upper collar 36 is fitted against the hub 32 of the steering wheel and has the lower end thereof disposed within the recess 40. The lower end of the upper collar has an indentation 43 to receive one end of a compression spring 44 which is concentrically located about the upper shaft 26. The other end of the spring 44 bottoms against the annular surface 42 of the lower collar. The steering column is maintained in an assembled relation by a nut 45 threadedly connected to the upper end of the shaft 26 such that the spring 44 is partially loaded when the locking mechanism is in the extended and locking position as illustrated in FIG. 3. Thus the spring 44 provides a force for driving the lower collar 37 downwardly in order that the surface 39 of the cavity envelopes the conoidal surface 31 at the juncture of the shaft 24 and 26 whereby hoop stresses at the cavity produces forces normal to the surfaces causing the shafts to be wedged in axial alignment with each other.

The lower collar 37 has an annular cammed surface 48 formed at that lower end of the collar disposed adjacent the retaining collar 21. The retaining collar 21 also has an annular and upwardly facing cammed surface 50 which is formed to provide a mating relation with the surface 48 of the collar 37. This relationship is best seen in FIG. 5 which shows a profile of the aforementioned cammed surfaces (48, 50) slightly spaced apart to more clearly illustrate the mating relationship between the surfaces. In the assembled mode this slight spacing would not exist since the surfaces normally contact one another. The cammed surfaces (48, 50) provide a releasing means for the locking mechanism. This is accomplished by utilizing the cammed surfaces for the production of large upwardly directed forces on the lower collar 37 and in directions of the principal axis thereof and to thereby selectively produce a slight upward axial displacement of the lower collar to dislodge it from its wedged relation about the juncture of the shafts. This is done by rotating the lower collar 37 relative to the retaining collar 21 as indicated by the arrows illustrated in FIG. 5.

It can be appreciated that in the locking position the lower collar 37 encases the juncture of the upper and lower shaft 26, 24 to effect a securing of the shafts in a predetermined orientation such as an axial alignment depicted in the instant embodiment. The collar 37 also serves to prevent slight pivotal movement between the shafts by enveloping the juncture such that a wedging action takes place thereat because of the protuberant shape of the mating contacting surfaces 31 and 39 of the juncture of the shafts 24, 26 and the cavity of the lower collar. At this position the upper and lower collars (36, 37) are in the extended position (see FIG. 3) and the upper steering shaft is wedge-locked in position whereat looseness and wiggle at the steering wheel 19 is prevented.

To place the steering column in the collapsed position the locking mechanism must be released. To accomplish this the steering wheel 19 and the lower collar 37 are grasped and simultaneously urged to rotate in opposite directions as indicated by the arrows in FIG. 5. Since the retaining collar 21 is fixedly secured to the lower shaft 24 the rotative force exerted on the steering wheel 19 is applied to the retaining collar 21. Because the lower collar 37 and the retaining collar 21 have contiguous cammed surfaces 48 and 50, a camming action takes place thereat effecting a great mechanical advantage to produce attendant forces for axially displacing the lower collar 37 upwardly a slight distance which breaks and releases the wedging action of the lower collar on the juncture of the shafts 24 and 26. Now the lower collar 37 can be easily moved upwardly in telescoping relation over the upper collar 36 as indicated to a fully retracted position indicated by the broken lines of FIG. 3.

When the lower collar 37 is in the retracted position the shafts 24 and 26 can be pivoted relative to each other and the steering column can be positioned in the collapsed position as suggested by the broken lines in FIGS. 1 and 2.

Still another feature of the invention is that when the locking mechanism is in the retracted position, the upper collar 36 is, for the most part, disposed within the recess 40 of the lower collar 37 whereat the upper collar 36 serves as an underlying support for the peripheral wall structure 41 of the lower wall structure. It can be appreciated that when the steering column lies on the collapsed position, which is remote from the substantially upright operating position, it is much more vulnerable to damage by object falling and otherwise striking the peripheral wall structure 41. For if the wall structure 41 is sufficiently dented or deformed the telescoping action would be prevented and the locking mechanism would become inoperative; however, this is prevented by the upper collar providing an underlying support within and for the peripheral wall structure 41 in that most vulnerable position.

It can be seen that in the collapsed position the steering wheel 19 is swingable to a position laterally removed from the operator's compartment or space 16 thereby improving the accessibility to the mower. In this movement the upper shaft 26 acts as a pivot arm for rotating the lower shaft 24 about its axis.

To return the steering column to the upright operating position, the operator need only to pivot the upper steering shaft 26 relative to the lower shaft 24 until the two shafts are in aproximate axial alignment with each other, when this occurs the spring loaded lower collar 37 snaps into the extended position whereat the surface 39 of the cavity envelopes the conoidal surface 31 at the juncture of the shafts to effect the locking and wedging action as hereinbefore described. The steering column now is positioned for operation.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods

What is claimed is:

1. A collapsible steering column of the type selectively positionable between a locked upright operating position and a storage position displaced from said operating position, said steering column comprising:
   a support;
   a first steering shaft journaled to said support;
   a second steering shaft having one end thereof pivotally connected to said first shaft at a common juncture, each of said shafts cooperating to form a protuberant outer surface at said juncture upon placing said steering column in said operating position;
   steering means disposed on said second shaft in spaced relation to said juncture;
   locking means selectively actuatable for effecting a wedging action on said juncture, said wedging action operative to lock said steering column in said operating position and prevent relative pivotal movement of said shafts at said juncture.

2. The invention as recited in claim 1 wherein said steering column includes means for releasing said locking means from said wedging action on said juncture.

3. The invention as recited in claim 2 wherein said locking means includes a first collar slidably mounted on one of said shafts, said first collar having a concavity selectively disposable in nestling relation about said protuberance outer surface of said juncture to effect said wedging action thereat.

4. The invention as recited in claim 3 wherein said locking means includes biasing means acting upon said first collar and operative to urge the same into wedging relation with said shafts at said juncture.

5. The invention as recited in claim 4 wherein said common juncture of said shafts in said operating position has a conoidal shape defining said protuberant outer surface, and the concavity of said first collar defines a conoidally shaped inner wall structure operative for mating with said conoidal shape of said juncture to effect said wedging action therewith.

6. The invention as recited in claim 5 wherein said releasing means includes an element affixedly mounted on said first steering shaft, said element having a cam surface disposed adjacent said first collar, said first collar having a cam surface contiguous with the cam surface of said element, and the cam surfaces disposed such that relative movement between the first collar and element produce a camming action operative to force the first collar in a direction to dislodge the same from the wedging action on said juncture.

7. The invention as recited in claim 2 wherein said first collar has a recessed portion defining a peripheral wall structure, said recessed portion being in spaced relation from said concavity, and said locking means comprising a second collar disposed on said one shaft and telescopically displaceable within the recessed portion of said first collar in a supporting close proximity to said peripheral wall structure.

8. The invention as recited in claim 7 wherein said common juncture has a conoidal shape defining said protuberant outer surface, and said concavity of said first collar has a conoidal shape which matingly envelops the juncture upon actuation of said locking means to thereby lock said steering column in said operating position.

9. The invention as recited in claim 8 wherein said locking means includes biasing means operative between said first and second collars to urge said first collar to envelope said juncture upon placing said steering column in said operating position.

10. The invention as recited in claim 9 wherein said biasing means comprises a compression spring concentrically mounted on said shaft within said recessed portion and having its opposite ends in engagement with said first and second collars.

11. A steering column selectively positionable between an operating position and a collapsed position remote from said operating position, said steering column comprising:
    a support;
    a lower steering shaft rotatably mounted on said support;
    an upper steering shaft;
    steering means operatively connected to said upper steering shaft;
    a juncture at which adjacent ends of said shafts are hingedly connected, said shafts forming at said juncture a conoidally shaped surface upon arranging said steering column in said operating position from said collapsed position;
    a locking collar slidably mounted on one of said shafts, said collar including a concavity having a conoidal shape matingly conformable to said surface of said juncture said collar displaceable to a locking relation whereat said concavity envelops said juncture producing a wedging action therewith to lock said steering column in said operating position.

12. The invention as recited in claim 11 wherein said steering column includes releasing means for breaking the wedging action of said collar by displacement of said collar from said locking position in order that said steering column can be pivoted to the collapsed position.

13. The invention as recited in claim 12 wherein said steering column includes biasing means urging said collar toward said juncture whereupon the concavity of said collar is driven to envelop said juncture.

14. The invention as recited in claim 13 wherein said releasing means comprises a camming collar affixedly mounted on said lower shaft and disposed adjacent said juncture, said camming collar having an upwardly facing cam surface; and said locking collar having a cam surface at one end thereof, said cam surfaces being disposed in a camming relation to each other upon said locking collar being placed in said locking relation, each collar and respective came surface selectively movable relative to one another whereupon such movement produces forces on said locking collar to effect a displacement thereof from said locking relation on said juncture.

References Cited

UNITED STATES PATENTS

| 3,556,549 | 1/1971 | Hershman et al. | 74—493 X |
| 3,561,282 | 2/1971 | Hershman et al. | 74—493 |

MILTON KAUFMAN, Primary Examiner

U.S. Cl. X.R.

180—78; 280—87 A; 287—98